(12) United States Patent
Elzein et al.

(10) Patent No.: US 9,304,846 B2
(45) Date of Patent: Apr. 5, 2016

(54) APPARATUS AND METHOD OF ERROR MONITORING WITH A DIAGNOSTIC MODULE

(71) Applicant: Ford Global Technologies, LLC, Dearborn, MI (US)

(72) Inventors: Hadi Elzein, Dearborn, MI (US); Jeffrey Raymond Ostrowski, Plymouth, MI (US); Doron M. Elliott, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/264,672

(22) Filed: Apr. 29, 2014

(65) Prior Publication Data

US 2015/0309859 A1 Oct. 29, 2015

(51) Int. Cl.
| | |
|---|---|
| *G06F 11/00* | (2006.01) |
| *G06F 11/07* | (2006.01) |
| *G07C 5/00* | (2006.01) |
| *G07C 5/08* | (2006.01) |
| *H04L 29/08* | (2006.01) |
| *H04W 24/04* | (2009.01) |

(52) U.S. Cl.
CPC ........ *G06F 11/0787* (2013.01); *G06F 11/0709* (2013.01); *G06F 11/0739* (2013.01); *G06F 11/0766* (2013.01); *G07C 5/008* (2013.01); *G07C 5/0808* (2013.01); *H04L 67/02* (2013.01); *H04W 24/04* (2013.01)

(58) Field of Classification Search
CPC ............ G06F 11/0739; G06F 11/0748; G06F 11/0766; G06F 11/0787; G06C 5/008; G06C 5/0808; H04W 24/04
See application file for complete search history.

(56) References Cited

U.S. PATENT DOCUMENTS

| | | | | |
|---|---|---|---|---|
| 6,604,038 | B1 * | 8/2003 | Lesesky | G07C 5/008 340/988 |
| 8,036,788 | B2 | 10/2011 | Breed | |
| 2004/0203379 | A1 | 10/2004 | Witkowski et al. | |
| 2004/0203554 | A1 * | 10/2004 | Simon | H04W 52/0229 455/345 |
| 2004/0249526 | A1 * | 12/2004 | Hauer | G08C 17/00 701/32.7 |
| 2006/0229777 | A1 * | 10/2006 | Hudson | G01M 15/05 701/31.4 |
| 2008/0316006 | A1 | 12/2008 | Bauman et al. | |
| 2009/0204287 | A1 * | 8/2009 | Blanz | G07C 5/008 701/31.4 |
| 2009/0276115 | A1 * | 11/2009 | Chen | G07C 5/008 701/29.6 |
| 2009/0328189 | A1 * | 12/2009 | Budyta | H04L 9/32 726/14 |
| 2010/0057290 | A1 * | 3/2010 | Brillhart | G06Q 10/06 701/31.4 |
| 2010/0256861 | A1 | 10/2010 | Hodges | |
| 2011/0296037 | A1 * | 12/2011 | Westra | H04L 67/141 709/228 |

(Continued)

*Primary Examiner* — Joshua P Lottich
(74) *Attorney, Agent, or Firm* — Jennifer M. Stec; Brooks Kushman P.C.

(57) ABSTRACT

A vehicle computer system configured to communicate with a mobile device, comprising a wireless transceiver configured to communicate with the mobile device. The vehicle computer system also includes a processor in communication with the wireless transceiver and memory. The processor is configured to monitor activity occurring at the wireless transceiver, receive a message from the wireless transceiver that includes information related to one or more software states of the wireless transceiver, determine an error has occurred at the wireless transceiver, save the information related to the one or more software states of the wireless transceiver in the memory, and send the information related to the one or more software states.

20 Claims, 3 Drawing Sheets

(56) References Cited

U.S. PATENT DOCUMENTS

| | | | | |
|---|---|---|---|---|
| 2012/0157069 A1* | 6/2012 | Elliott | .................... | H04W 4/16 455/418 |
| 2012/0232742 A1* | 9/2012 | Elliott | .................... | H04L 67/12 701/29.7 |
| 2013/0204484 A1* | 8/2013 | Ricci | .................... | G06F 17/00 701/29.4 |
| 2013/0205412 A1* | 8/2013 | Ricci | .................... | G06F 3/0484 726/29 |
| 2013/0227648 A1* | 8/2013 | Ricci | .................... | H04W 12/08 726/3 |
| 2014/0065965 A1* | 3/2014 | Prasad | .................... | G07C 5/008 455/41.2 |
| 2014/0172228 A1* | 6/2014 | Wilson | .................... | G07C 5/008 701/31.5 |

* cited by examiner

APPARATUS AND METHOD OF ERROR MONITORING WITH A DIAGNOSTIC MODULE

TECHNICAL FIELD

The illustrative embodiments generally relate to an apparatus and method for software implementation between a vehicle and a mobile device.

BACKGROUND

U.S. Pat. No. 8,036,788 discloses a system and method for monitoring the condition of a vehicle that includes a communications unit arranged to interface with a wireless communications network, at least one sensor for monitoring at least one component or subsystem of the vehicle and which is coupled to the communications unit, and a remote site connected to the wireless communications network and arranged to receive diagnostic or prognostic messages from the vehicle with the transmission initiated therefrom. A diagnostic module may be provided, included or coupled to the sensor(s) and directs the communications unit to transmit a message to the remote site upon determining an actual and/or potential failure of a component or subsystem.

United States Patent Pub. No. 2010/0256861 discloses a system for monitoring a vehicle's health status. The system comprises a vehicle monitoring computer system configured to receive information associating a cell phone with a vehicle, receive vehicle diagnostic information including vehicle conditions, automatically determine a severity status for the vehicle conditions based on pre-defined severity status values, and if the severity status for any vehicle condition exceeds a pre-defined severity threshold value, automatically transmit a text message to the cellular telephone. Another aspect includes a system for detecting and monitoring a vehicle's health status. The system comprises a vehicle monitoring computer system and a vehicle computer system configured to communicate wirelessly with a cellular telephone located within a vehicle or its vicinity to transmit diagnostic information to a telecommunications network for communication with the vehicle monitoring system.

SUMMARY

A first illustrative embodiment includes a vehicle computer system configured to communicate with a mobile device comprising a wireless transceiver configured to communicate with the mobile device. The vehicle computer system also includes a processor in communication with the wireless transceiver and memory. The processor is configured to monitor activity occurring at the wireless transceiver, receive a message from the wireless transceiver that includes information related to one or more software states of the wireless transceiver, determine an error has occurred at the wireless transceiver, save the information related to the one or more software states of the wireless transceiver in the memory, and send the information related to the one or more software states.

A second illustrative embodiment includes an apparatus comprising a wireless transceiver configured to communicate with a mobile device and a processor in communication with the wireless transceiver. The processor is configured to monitor activity occurring at the wireless transceiver, receive a message from the wireless transceiver that includes information related to one or more software states of the wireless transceiver, determine an error has occurred at the wireless transceiver, and send the information related to the software states.

A third illustrative embodiment includes an apparatus comprising a wireless transceiver configured to communicate with a mobile device, and a processor in communication with the wireless transceiver. The processor is configured to receive a message from the wireless transceiver that includes information related to one or more software states of the wireless transceiver, determine an error has occurred at the wireless transceiver based on the software states, and send the information related to the software states via the wireless transceiver.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
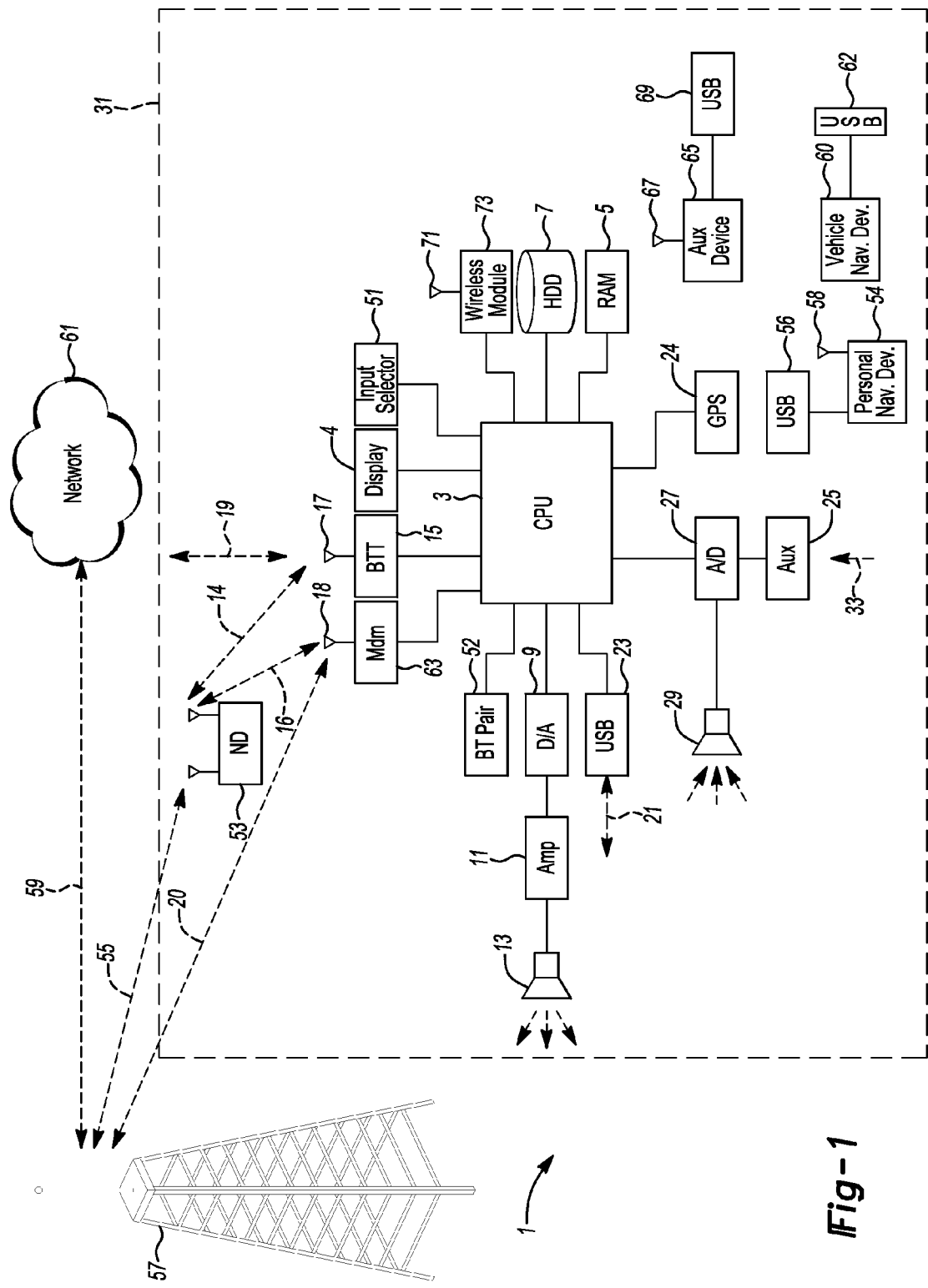
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
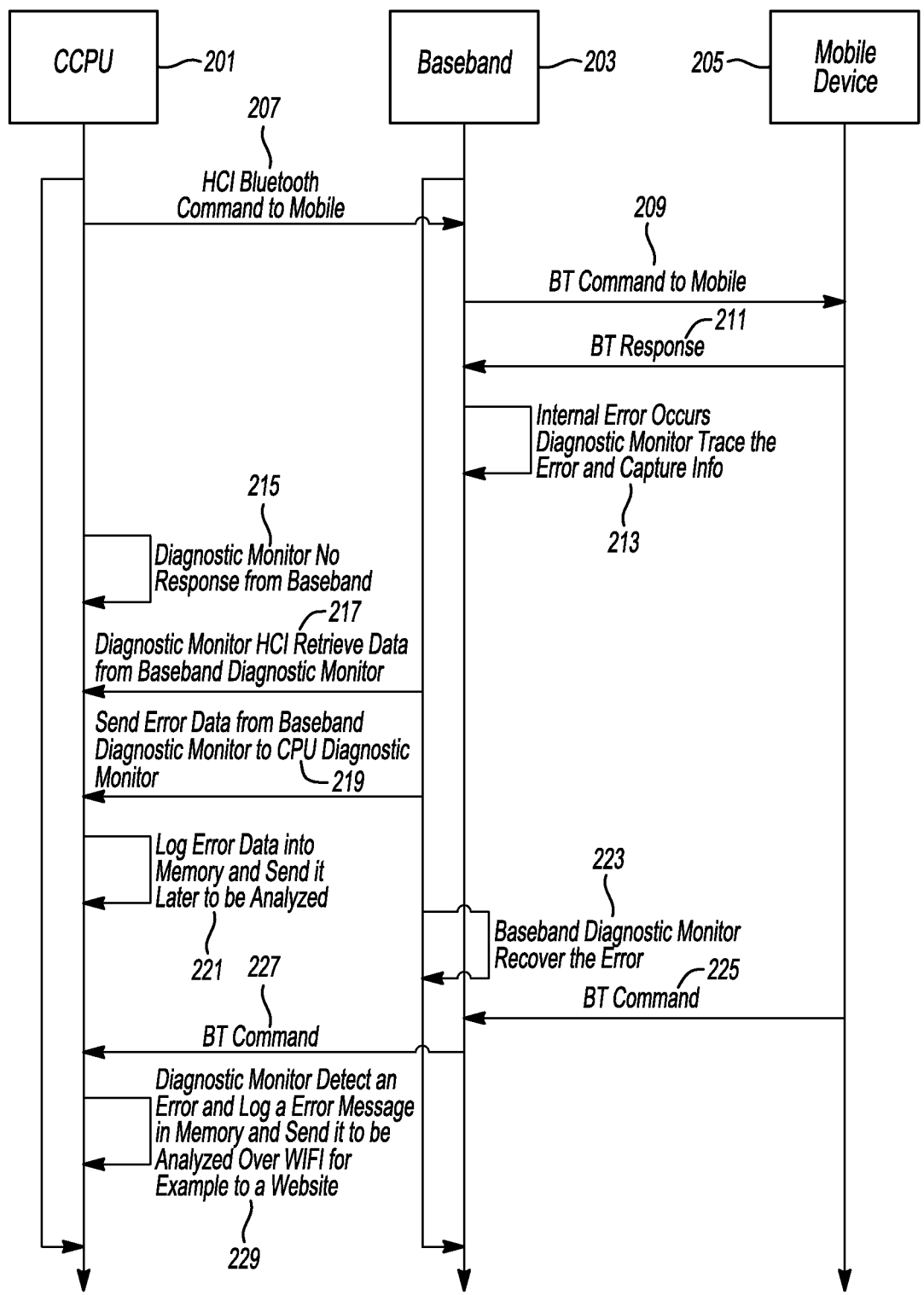
FIG. 2 illustrates an example sequence diagram of the vehicle based computing system interacting with a mobile device and baseband processor for diagnostic monitoring.

FIG. 2 illustrates an example sequence diagram of the vehicle based computing system 201 interacting with a mobile device 205 and baseband processor 203 for diagnostic monitoring. The diagnostics mode may monitor may determine the health of a vehicle computer system that interacts with other devices via a protocol such as Bluetooth. The vehicle computer system may utilize the diagnostic monitoring of the baseband and its various software layers through various software stacks and profiles (e.g. Bluetooth profiles such as A2DP, HFP, PBAP, etc). The diagnostics mode and monitoring may provide data about the stack performance and log details of errors captured in a Bluetooth system during interaction within a Bluetooth piconet. The diagnostic mode/monitor may also log errors captured in various states that causes mal-functioning of various features (e.g. the hands-free system, voice recognition, etc). The diagnostic monitoring may also log valid behavior of various software states. For example, information related to successful connections and communication may be monitored and logged for future analysis. The diagnostic mode may be utilized for Bluetooth systems, as well as other wired or wireless networks (e.g. Wi-Fi, ZigBee, serial, USB, etc.).

In an illustrative embodiment, a processor 201 such as the CCPU may communicate with the baseband processor 203 for diagnostic monitoring. The CCPU 201 may send an HCI Bluetooth Command 207 to a mobile device 205 via a baseband processor. The HCI Bluetooth Command may include various commands well known in the art to allow the VCS to control, send, or receive data from the mobile device (e.g. change volume, change tracks, answer phone, hang up phone, update phonebook contact list, etc.). The baseband transceiver 203 facilitates communication between the mobile device and VCS to send the Bluetooth command to the mobile device 209 for these instructions. In turn, the mobile device 205 may respond 205 to the command by sending information or data to the baseband transceiver. For example, the VCS may request to hang-up a cellular phone. When the BT command is sent and the mobile device responds by hanging up the phone, the mobile device may respond 211 with information to notify the VCS that the command was executed. Thus, various functionality may occur on the VCS once that data is retrieved (e.g. update HMI on the VCS display).

The baseband processor 203 may continually monitor for internal errors. This may allow the diagnostic monitor to trace errors and capture information during the exchange of information between the mobile device and VCS. During communication between the VCS and mobile device an internal error may occur. The diagnostic monitor may trace the error and capture the info 213. The monitoring of the error data may be shared between the baseband transceiver with the CCPU or mobile device to help facilitate for error recovery and future diagnostic repairs.

The CCPU may also be running a diagnostic monitor. The diagnostic monitor recognize there is no response 215 from the mobile device during communication within a Bluetooth piconet/network. During such an occurrence, the CCPU may retrieve data from the baseband's diagnostic monitor 217. The CCPU may request the data or the baseband may actively send the data during an error 219. The diagnostic component may keep a trace of which component was executed in the software component during a malfunction. The diagnostic component may also request the values of all the state variables of the stack layers, such as RFCOMM/L2CAP and various profiles. The diagnostic component may also keep track of the key buffer states in terms of memory occupation, overflow, etc. For example, if a crash took place in the MAP profile due to a parsing error, the tracing mechanism may have a log of where the crash took place up to granularity of line number, if possible.

This information may be logged according to various DTC logging requirements. The CCPU may log any such errors in memory 221 for later use. The diagnostic component may log a DTC error with data packet that includes a predefined field and format in memory. This packet may contain all of the data captured during the tracing mechanism until the error has occurred as described later.

In another scenario, the baseband diagnostic monitor may recover from the error 223. The diagnostics monitor may determine if each layer of the stack is running and responding to handshaking transactions on the established channels. For example, the diagnostics monitor may detect if the RFCOMM layer in the CCPU stopped responding to the phone handshaking messages on a specific channel which caused a disconnect and whether the reconnection attempt and retries failed. In the case the diagnostic monitor shall reset either the RFCOMM layer if the ACL is still active or the whole Bluetooth stack according to a reset strategy. If the phone stopped responding to connections retries from the Bluetooth stack, the diagnostic monitor shall recommend to the HMI layer to display to the user a message stating the recovery steps required by turning the phone off and back on as the phone HMI Bluetooth specification states.

In another scenario, the mobile device may instead initiate a Bluetooth command 225 to the baseband transceiver. The command may include different actions, such as adjusting volume, adjust volume, control operation of the VCS, etc. Upon the baseband receiver receiving the BT command, the baseband receiver may request the CCPU or the VCS to act out the operation requested by the mobile phone. The baseband transceiver may send the BT command 227 to the CCPU for the VCS to operate the command. When sending the BT command, the transceiver may utilize the Bluetooth protocol to ensure the VCS may understand the requested command. If an error occurs, the diagnostic monitor of the CCPU may detect the error 229. Upon detection of the error, the diagnostic monitor may log the error message in memory. The logging of the message may allow the system to send the information related to the error message and software states at a later time. For example, the information related to the software states or error messages may be sent over WiFi to a particular website. The website may store the software state information to analyze the code to prevent future errors.

The diagnostic monitor may transfer the logged DTC to an off-board server (e.g. a manufacturer or supplier's website, software vendor, etc) for analysis and fixing. In one example, if a vehicle is parked near a user's home, the VCS may access the user's WIFI network. As the vehicle approaches the vicinity of the customer's home network, it may connect to an off-board server (e.g. the Ford Website). The vehicle may authenticate via a password assigned to that specific customer to log the DTC in the customer's error portfolio for analysis. This process may be executed on any number of occurrences (e.g. daily, weekly, monthly, etc). Upon transferring the DTC logs to the off-board site, the DTCs within the vehicle may be deleted and overwritten the next day by a new set of DTCs. Numerous other scenarios or situations may occur to log information. For example, in another scenario, the user may visit a dealership for routine service, maintenance, or a repair. Upon entering the dealership, the vehicle may connect to the dealer's wifi network to transfer the DTC logs.

Figure 3:
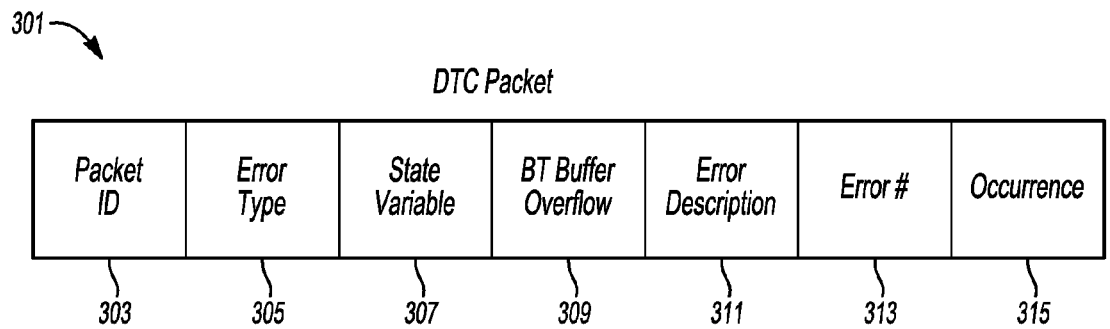
FIG. 3 illustrates an example of a DTC packet that may be used to communicate data.

FIG. 3 illustrates an illustrative embodiment of a DTC Packet 301. The DTC packet may include various descriptions to help facilitate error monitoring. In one example, the DTC packet may include a Packet ID 303. The Packet ID 303 may provide an identification name or id associated with a specific packet. This may help identify specific packets that contain specific data. Thus, if the packet is designated for a specific action or information, the packet ID may help identify it.

Additionally, the DTC packet 301 may also include an Error Type 305. The Error Type 303 may describe a crash (specify what component crashed, for example MAP), a disconnect for a specific BT profile (e.g. BT, MAP, PBAP, AVRCP, A2DP), a disconnect for a stack or protocol (e.g. RFCOMM disconnect, L2CAP disconnect,etc.), an HCI buffer overflow, UART overflow, other buffers overflow (e.g. specific the component overflow), etc. . . . This may help prevent memory violation when using various embodiments of the system.

Additionally, the DTC packet 301 may include a descriptor for the state variables 207. All Profiles state variables, RFCOMM state variable, L2CAP state variables, HCI state variables, other Bluetooth software components state variables.

The DTC packet may include a descriptor for a Bluetooth Buffers Overflow 309. The BT Buffer Overflow may explain which buffer was corrupted and memory occupation of the overflow. By analyzing the buffer overflow error, software may be updated to prevent a program or process to store more data in buffer than it was intend to hold. It may also be utilized to identify a buffer overflow attack.

The DTC packet may include a descriptor for an error description 311. The error description may describe a reason for error code if it is provided by the implementation such as disconnects reason error code or stack timeout error code, SMS message contains bad or unknown characters error code, etc. . . .

The DTC packet may include a descriptor for a line number 313. The line number descriptor 313 of the last instruction executed when the error occurred. This may help diagnose the exact line of code that causes any type of error. This may help facilitate troubleshooting of the actual code to correct any errors that occurred.

The DTC packet may include a descriptor for the occurrence 315. This may describe the error in detail or the number of occurrences of same error (Packet ID). This may help facilitate troubleshooting of the code to help identify reoccurring errors that are routinely occurring based on specific code that is executed.

FIG. 3 should only serve as example and be used as an illustration to explain only one example of a DTC packet. The descriptors of a DTC packet may be rearranged, expanded, minimized, or refined. For example, a DTC packet may not include every descriptor shown, such as the line number descriptor. Additionally, the DTC packet may include additional descriptors to include extra information to explain the error that occurs.

Each manufacturer may define a unique diagnostic message to test the health and state of a wireless transceiver (e.g. Bluetooth baseband). The message may be supported by the suppliers of the transceiver. The supplier and OEM may come to agreement to determine the message set for interoperability. The message may be an HCI request packet. The message may be sent by the CCPU to the transceiver (e.g. Bluetooth baseband) to request various software states, memory buffer states, or other information. One illustrative example of the message field is as follow:

| 7 | 6 | 5 | 4 | 3 | 2 | 1 | 0 |
|---|---|---|---|---|---|---|---|

Bit Zero: if set to 1, may test the ACL connectivity health of the baseband. It may also determine if the handshaking on the link layer and RF layer is active. This bit may also determine if the baseband stopped responding to AG messages on the ACL. Additionally, it could determine if the page timeout is a software health issue in the baseband or a hardware issue. The baseband may implement a diagnostic monitor to determine if the software in the chipset reached an error state that helps determine the health of the connection and its states.

Bit One: if set to 1: The baseband may dump its software stack state variables to be logged by the Ford BT diagnostic monitors into a website where it can be provided to the baseband supplier for debugging. This may occur when the VCS is first connected to the internet.

Bit Two: if set to 1: The baseband shall provide the states of its memory buffers, their sizes, and whether they are corrupted. This may help trouble shoot software issues to help debug errors.

Bit Three: if set to 1: The baseband shall provide a diagnostic state of its BT hardware devices and peripherals. This may help trouble shoot software issues to help debug errors.

Bit Four: if set to 1: The baseband shall provide a diagnostic state of the BT HCI UART driver. This may help trouble shoot specific software issues related to the drivers associated with the BT hardware.

Bit Five-Seven: may be used for any number of methods for future use for other embodiments that could contain data to identify errors in code. Thus, bits five-seven may be utilized for other data that the CCPU may requested from the baseband transceiver. For example, specific BT profiles may contain unique software that the CCPU may request diagnostic information from by utilizing one of these bits. Additional embodiments may be apparent to one of ordinary skill in the art.

The VCS may be able to define various diagnostic modes that may log errors. The diagnostic modes may be different and defined for different situations. For example, the diagnostic mode may include a diagnostic mode for bench testing. A bench test mode may be ran by testers at a bench or during a testing phase of the vehicle. In a bench test mode, a user or tester may be able to pass a message to the diagnostic monitor through a RS232, USB, Ethernet, or another wired or wireless protocol to execute a unique HCI pre-determined command or a unique profile pre-determined command. For example, the diagnostic monitor may form a HCI command to pass it through the stack to the MAP profile with a SMS notification message. The profile should acknowledge this message which indicates whether the MAP connection is valid and successful. In another example the opposite path should happen where one of the profiles passes a message to the stack and a HCI packet should be formed and detected by a sniffer. A variety of messages and command should be formed and built. These tests as they run in case the profile or stack is in bad state will trace the software path taken such as function names and state variables and determines where the hung up occurred. Any number of diagnostic modes may be utilized for various situations.

Figure 4:
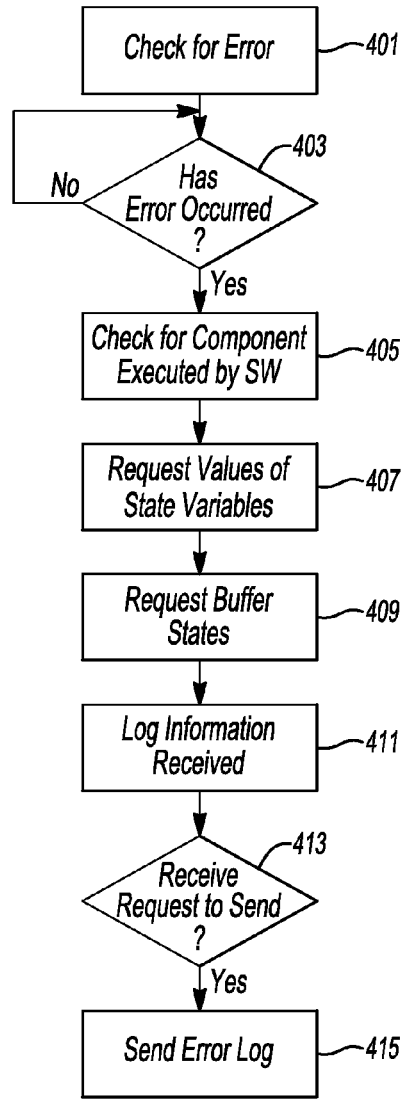
FIG. 4 illustrates an example use cases an example flow chart of the vehicle based computing system interacting with a mobile device and baseband processor for diagnostic monitoring.

FIG. 4 illustrates an example flow chart of the vehicle based computing system interacting with a mobile device and baseband processor for diagnostic monitoring. Various embodiments may include a processor adapted to include instructions to execute the following algorithm for diagnostic monitoring. The processor may be set automatically or manually to check for errors 401. Thus, the processor may consistently monitor for errors 403 during communication with a mobile device. If no error has occurred, the processor may function as normal and continue to monitor for issues. However, if an error occurs, the diagnostic mode may work to determine the root cause of the error.

The processor may check for the component that was executed by various software modules or applications 405. This may help determine the root cause of the errors. The diagnostic mode may capture errors, trace error occurrence in software, log errors, monitor heartbeats from the stack layers as an indication of connectivity, log stack and profiles state and main variables value during error occurrence, test baseband, and send errors over WiFi. In one example, the diagnostic mode may test the baseband by passing pre-determined messages to the baseband and expect a reply back that provides data and status of its state. The diagnostic mode may also be able to push predetermined messages through the stack HCI up to the profiles and from the profiles down to the HCI to test system health in special diagnostics mode that allow for more logging opportunities.

Additionally, the diagnostic monitoring may request values of various state variables 407 in the baseband processor or CCPU. The diagnostic mode may capture the state of the Bluetooth system during mal-functioning states and log activity or errors in memory. The diagnostic component may also request the values of all the state variables of the stack layers, such as RFCOMM/L2CAP and various profiles to log. The logging may allow information to be sent by the driver over a WIFI network to an off-board website for analysis, debugging, and/or investigation. The diagnostic mode may signal to other software components in the system to reset the software states of the mal-functioning component or components like the stack and profiles to resolve an issue. For example, the diagnostic mode may initiate a new connection with the mobile phone. The logging data may also be retrieved manually from a person using external memory.

The diagnostic monitoring may request buffer states 409. This also the diagnostic component to keep track of the key buffer states in terms of memory occupation, overflow, etc. For example, if a crash took place in the MAP profile due to a parsing error, the tracing mechanism may have a log of where the crash took place up to granularity of line number, if possible. Such data may helpful when extracted from the log to debug any software errors.

Upon retrieving diagnostic monitoring information, the CCPU may log the information received 411. The data may be sent to an off-board server during certain scenarios or retrieved manually from a user or technician (e.g. dealership technician). In one scenario, the CCPU may logged an error occurred during the Bluetooth pairing processor. The CPU may be programmed to send the logging information to an off-board server during a certain scenario. For example, once an error is log, the CCPU may send instructions to the baseband processor or another transceiver to send the information to an OEM's server at the first occurrence of connecting to the Internet. The VCS may connect to the internet by utilizing a user's mobile phone (e.g. 3G/CDMA/GSM4G/LTE data connection) or via a Wi-Fi connection. A third party server may be utilized to analyze the errors for future software upgrade fixes. In another scenario, the CCPU may send the data when a dealer technician or customer plugs in a USB stick (or another memory device) after an error is logged. A message may pop-up on the VCS display may confirm whether to transfer the logged information to an external device or send to an off-board server.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system (VCS) configured to communicate with a mobile device, comprising:
   a wireless transceiver configured to communicate with the mobile device;
   a processor in communication with the wireless transceiver and memory, the processor configured to:
   1.) monitor activity occurring at the wireless transceiver;
   2.) receive a message from the wireless transceiver that includes information related to one or more software states of the wireless transceiver;
   3.) determine an error has occurred at the wireless transceiver;
   4.) save the information related to the one or more software states of the wireless transceiver in the memory; and
   5.) send the information related to the one or more software states.

2. The vehicle computer system configured to communicate with a mobile device of claim 1, wherein the processor is further configured to monitor activity occurring at the wireless transceiver by sending a request-packet to the wireless transceiver requesting information regarding the one or more software states of the wireless transceiver.

3. The vehicle computer system configured to communicate with a mobile device of claim 1, wherein the processor is further configured to send the information related to the one or more software states of the wireless transceiver to an off-board server via the wireless transceiver.

4. The vehicle computer system configured to communicate with a mobile device of claim 1, wherein the processor is further configured to send the information related to the one or more software states to an off-board server via a long-range wireless transceiver.

5. The vehicle computer system configured to communicate with a mobile device of claim 4, wherein the long-range transceiver is a cellular modem.

6. The vehicle computer system configured to communicate with a mobile device of claim 1, wherein the processor is further configured to send the information related to the one or more software states to an external memory device via a short-range transceiver.

7. The vehicle computer system configured to communicate with a mobile device of claim 6, wherein the short-range transceiver is a universal serial bus (USB) transceiver.

8. The vehicle computer system configured to communicate with a mobile device of claim 1, wherein the processor is further configured to monitor activity occurring at the wireless transceiver based upon receiving an input to activate a diagnostic mode, the diagnostic mode defining the activity that is monitored at the wireless transceiver.

9. The vehicle computer system configured to communicate with a mobile device of claim 8, wherein the diagnostic mode defining the activity includes a trouble-shooting mode.

10. The vehicle computer system configured to communicate with a mobile device of claim 1, wherein the information related to the one or more software states includes data regarding error behavior and valid behavior of the wireless transceiver.

11. An apparatus, comprising:
a wireless transceiver configured to communicate with a mobile device;
a processor in communication with the wireless transceiver, the processor configured to:
monitor activity occurring at the wireless transceiver;
receive a message from the wireless transceiver that includes information related to one or more software states of the wireless transceiver;
determine an error has occurred at the wireless transceiver; and
send the information related to the software states.

12. The apparatus of claim 11, wherein the processor is further configured to send the information related to the one or more software states of the wireless transceiver to an off-board server via the wireless transceiver.

13. The apparatus of claim 11, wherein the processor is further configured to send the information related to the one or more software states to an off-board server via a long-range wireless transceiver.

14. The apparatus of claim 13, wherein the long-range transceiver is a cellular modem.

15. The apparatus of claim 11, wherein the processor is further configured to send the information related to the one or more software states to an external memory device via a short-range transceiver.

16. The apparatus of claim 15, wherein the short-range transceiver is a universal serial bus (USB) transceiver.

17. An apparatus, comprising:
a wireless transceiver configured to communicate with a mobile device;
a processor in communication with the wireless transceiver, the processor configured to:
receive a message from the wireless transceiver that includes information related to one or more software states of the wireless transceiver;
determine an error has occurred at the wireless transceiver based on the software states; and
send the information related to the software states via the wireless transceiver.

18. The apparatus of claim 17, wherein the processor is further configured to send the information related to the one or more software states to an off-board server via a long-range wireless transceiver.

19. The apparatus of claim 18, wherein the long-range transceiver is a cellular modem.

20. The apparatus of claim 17, wherein the processor is further configured to send the information related to the one or more software states to an external memory device via a short-range transceiver.

* * * * *